Patented June 6, 1944

2,350,485

UNITED STATES PATENT OFFICE 2,350,485

METHOD OF PREPARING DIOLEFINS

Erving Arundale, Colonia, and Louis A. Mikeska, Westfield, N. J., assignors, by mesne assignments, to Jasco, Incorporated, a corporation of Louisiana No Drawing. Application December 20, 1940, Serial No. 370,980

5 Claims. (Cl. 260—681)

The present invention involves a process for the production of conjugated diolefins. This application is a continuation-in-part of copending application Serial No. 291,107 filed August 19, 1939.

Diolefins have previously been prepared by such methods as the dehydration of the corresponding glycol or unsaturated alcohol, the dehydrochlorination of the corresponding dichloride or unsaturated chloride, and the dehydrogenation of mono-olefinic or paraffinic hydrocarbons. Other methods have also been used, but they are rather involved and uneconomical; also, in most cases, they are not applicable to the production of all conjugated diolefins. The method of the present invention is applicable not only to the synthesis of diolefins available by other chemical methods, but also to the preparation of higher diolefins which have not heretofore been synthesized by any method.

According to the present invention, conjugated diolefins are prepared by a process involving simultaneous condensation and dehydration in which olefins, substituted derivatives thereof, or compounds capable of yielding olefins under the reaction conditions, are condensed with aldehydes under such conditions that the condensation product is immediately dehydrated. The process may be carried out either with or without the aid of a catalyst; however, the use of a catalyst is to be preferred. This reaction may be illustrated as follows:

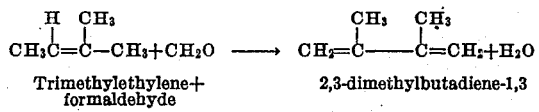

Trimethylethylene+ formaldehyde → 2,3-dimethylbutadiene-1,3

Olefinic materials suitable for use in the process of the present invention are olefins, such as propylene, isobutylene, butene-1, butene-2, trimethylethylene, methtylethylethylene, pentene-2, cyclohexene, etc., and compounds which are converted into olefins under the reaction conditions, such as secondary and tertiary alcohols and halides, e. g., isopropyl alcohol, tertiary butyl alcohol, tertiary amyl alcohol, tertiary butyl chloride, tertiary amyl chloride, etc. Also, mixtures of olefins or mixtures of olefins and paraffinic hydrocarbons may be used. Derivatives of olefins, such as unsaturated ethers and unsaturated halides, can also be used as the olefinic materials in the process of this invention; (these specific materials yield alkoxy and halogenated diolefins, respectively, when treated with aldehydes). It is of interest to mention at this point that the method of this invention can be applied to the interaction of poly-olefins, e. g., diolefins, and aldehydes, under appropriate reaction conditions to form known, as well as new and novel, poly-olefins containing one more double bond than the starting poly-olefin, e. g., triolefins.

The aldehydes used in carrying out the process of this invention may be aliphatic, such as formaldehyde (formalin), acetaldehyde, and propionaldehyde, or aromatic, such as benzaldehyde; or any compound, such as polymers of aldehydes, e. g., paraformaldehyde (trioxymethylene), acetals (including formals), cyclic acetals (including cyclic formals), which will decompose to yield an aldehyde under the reaction conditions, can be used as the aldehyde portion of the feed. The amount of olefin, or substance capable of yielding an olefin under the reaction conditions used, should be at least equal to the amount of aldehyde used on a molar basis. The use of excess olefin is beneficial.

Catalysts which are effective in promoting the reactions involved in this invention are acidic in character, and may be classified into two general groups, mineral and organic. In the mineral classification are mineral acids, mineral acid-acting compounds (e. g., mineral acid-acting salts), and other substances which are capable of acting as mineral acids in the presence of water or under the conditions of the reaction. Mineral acid catalysts include HCl, $H_2SO_4$, $HNO_3$, HBr, $H_3PO_4$, $H_2S_2O_7$, $HPO_3$, $H_4P_2O_7$, HF, $ClSO_3H$, $FSO_3H$, silicotungstic acid, fluosilicic acid, and the like. The following mineral acid-acting salt catalysts may be mentioned: $FeCl_3$, $ZnCl_2$, $ZnSO_4$, $AlCl_3$, $Fe_2(SO_4)_3$, $NaHSO_4$, $Al_2(SO_4)_3$, $NaH_2PO_4$, etc. Illustrative of the compounds which form acids with water and which may be used in the presence of water as catalysts for these reactions are $SO_2Cl_2$, $SOCl_2$, $SOBr_2$, $SO_2$, $N_2O_3$, NOCl, $PCl_3$, $PCl_5$, $POCl_3$, and $Cl_2$; (for example, $Cl_2$ may be passed into a heated mixture of olefin, aldehyde, and water).

The organic catalysts include organic acids and organic acid salts which are capable of giving an acid reaction under the reaction conditions of the present invention. These include aliphatic carboxylic acids, such as formic and oxalic acids, halogenated organic acids, such as chloroacetic acid, aliphatic and aromatic sulfonic acids, such as hexyl and phenyl sulfonic acids, alkyl and dialkyl sulfates, such as mono- and diethyl sulfates, alkyl phosphoric acids, acid halides, sulfoacetic acid, aniline hydrochloride and hydrobromide, and the like.

As a variation on the usual procedure for carrying out the process of this invention, a tertiary halide, water, and an aldehyde can be heated together. In this manner, the tertiary halide is dehydrohalogenated to yield an olefin and hydrohalogen acid; the acid then acts as a catalyst for the olefin-aldehyde condensation reaction.

Mixtures of the above catalysts may also be employed; for example, inorganic salts such as zinc chloride, calcium chloride, zinc sulfate, ammonium chloride, etc. may be added to mineral acids as reaction promoters. Such salts increase the activity of the catalyst. A mutual solvent such as ethylene glycol may be used to provide better contact between the reactants and catalyst. Organic acids having a relatively low hydrogen ion concentration, such as acetic acid, can be promoted as catalysts for these reactions by adding minute amounts of sulfuric acid, other mineral acids, or mineral acid salts to them. A catalyst of such a nature and concentration that it will cause polymerization of diolefins formed in this process should be avoided.

The acid concentration of the catalyst should not exceed 50%, and may range between 0.01 and 50%. With most of the mineral acid catalysts, the best results are obtained with acid concentrations ranging from 0.25 to 10%. A decrease in the acid concentration tends to improve the diolefin yield, but results in an increased reaction time. A decrease in the volume of the aqueous catalyst per unit volume of reactants also results in an increased reaction time but, in most instances, does not affect the diolefin yield. Thus, the use of large volumes of aqueous catalyst is beneficial, since increased reaction speeds result therefrom. Very dilute acid catalysts (0.01–10% concentration) can be used together with an inorganic salt as a promoter. More concentrated acid catalysts (25–50% concentration) may be used at lower reaction temperatures; in such cases, the reaction may be carried out under a partial vacuum. The strong organic acids, such as chloroacetic acid, can be used either undiluted or in solution in water or a solvent such as chloroform or ethylene dichloride.

When tertiary olefins are used, these reactions can be carried out in the absence of catalysts. For example, isobutylene and formaldehyde interact to form isoprene at a temperature of 180° C. in the absence of any catalyst.

Representative examples of conjugated diolefins which can be prepared by the process of the present invention are as follows:

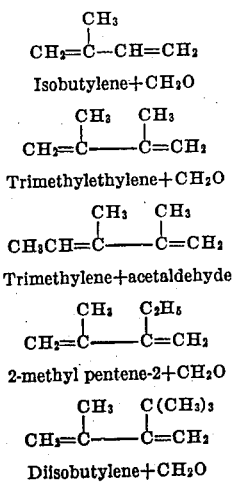

Isobutylene+CH₂O

Trimethylethylene+CH₂O

Trimethylene+acetaldehyde 2-methyl pentene-2+CH₂O

Diisobutylene+CH₂O

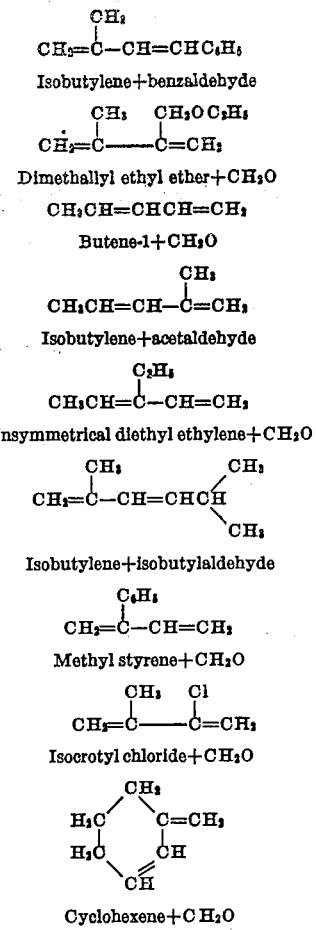

Isobutylene+benzaldehyde

Dimethallyl ethyl ether+CH₂O

Butene-1+CH₂O

Isobutylene+acetaldehyde

Unsymmetrical diethyl ethylene+CH₂O

Isobutylene+isobutylaldehyde

Methyl styrene+CH₂O

Isocrotyl chloride+CH₂O

Cyclohexene+CH₂O

The reaction temperatures in the present process may vary from 50° to 250° C. Higher operating temperatures are required for reactions involving primary olefins than for those involving secondary olefins; likewise, higher temperatures are required for secondary olefin-aldehyde reactions than for similar reactions of tertiary olefins.

The acid concentration of the catalyst also determines, to some extent, the optimum temperature for these reactions. When catalysts having a lower acid concentration are used, slightly higher temperatures are required to produce a given reaction rate. The optimum temperature ranges for these olefin-aldehyde reactions, when a catalyst having the preferred acid concentration of 0.25–5% is used, are 90°–110° C. for reactions involving tertiary olefins, 110°–140° C. for reactions involving secondary olefins and 140°–200° C. for primary olefin reactions.

The contact time is an important factor in the process, and may vary from 1 to 16 hours depending on the acid concentration of the catalyst and the reaction temperature. As the contact time is increased under a given set of conditions, the diolefin yield increases up to an optimum value and then, if contacting is continued, the yield steadily decreases.

Under the preferred conditions of reaction, the total operating pressure should at least equal the combined vapor pressures of the reactants and catalyst at the temperature of the reaction. However, the reaction pressure may vary between less than one and several atmospheres.

It is to be noted that the process of this application, like that of co-pending application 291,107, possesses three variables, namely, acid concentration, temperature, and time of contact. In application 291,107, these conditions were prescribed for maximum diol production. The present invention is directed to a maximum production of diene and, as a general rule, the conditions of reaction must be made more severe than those used for diol production. If two of these variables are set within the range specified for diol production, then the third variable must be made more severe than that utilized for diol production in order to raise the order of severity of reaction conditions above that used for diol production and to secure conditions favoring predominant diene production as, for example, with a fixed acid concentration and time of contact the lower temperature ranges favor diol production whereas the higher temperatures favor diene production.

The present invention is operative in either the liquid or vapor phase and as either a batch or continuous process. According to one modification of the invention, a mixture of olefin and aldehyde is slowly passed into a heated vessel containing the catalyst, the reaction mixture being agitated to provide good contact between the reactants and catalyst; the resulting diolefin is removed from the reaction system (by distillation) as it is formed. The reaction may be carried out under pressure in order to further improve the contact between reactants and catalyst. Some unreacted olefin and aldehyde may be carried over with the diolefin, but can be separated therefrom by fractionation and recycled to the reactor. Small amounts of cyclic acetals are produced as by-products of the desired reaction. These cyclic acetals may be converted into diolefins by the hydrolysis-dehydration process described in co-pending application No. 369,134, or may be recycled (as a source of aldehyde) to the reactor together with any unreacted olefin and aldehyde.

As another modification of the invention, the olefin, aldehyde, and catalyst may be passed together in concurrent direction or one of the reactants may be passed in countercurrent direction to the other reactant and catalyst, through a packed reactor heated to the desired temperature. The product is then fractionated, and any unreacted materials or by-product cyclic acetal can be recycled to the reactor.

A further modification of the invention involves passing a mixture of olefin (with or without water), tertiary alcohol, or tertiary halide and aldehyde in the vapor phase over an acid catalyst, such as phosphoric acid, acid-acting metallic phosphates, etc., deposited on a carrier such as pumice, the resulting diolefin being recovered from the vapors leaving the reactor.

It is known that diolefins are more reactive at higher temperatures than at lower temperatures. Under some of the conditions outlined in the present specification, the reaction takes place at temperatures as high as 250° C. Consequently, in order to obviate undesirable side reactions involving the diolefins formed in the present process, it would be an obvious modification of the present invention to initiate the reaction at 200° C. to 250° C. and then reduce the temperature to a temperature of the order of 100° C., holding the temperature at the latter level until the reaction is complete.

The diolefins made in accordance with this invention are useful in the preparation of synthetic rubber, as intermediates for further chemical reactions, and as anti-knock blending agents for gasoline.

The following example is given for the purpose of illustrating the invention:

*Example*

207 parts by weight of 5% sulfuric acid, 120 parts by weight of paraformaldehyde, and 247 parts by weight of trimethylethylene, were placed in a copper-lined bomb, and the bomb was capped and placed on a shaker machine. It was then shaken and heated at 98° to 102° C. for 16 hours. The formaldehyde reacted completely. The contents of the bomb were neutralized with 45% NaOH, and two layers formed. The upper layer was dried, separated from the drying agent by filtration, and fractionated. 74 parts by weight of 2,3-dimethylbutadiene-1,3, boiling between 68° and 70° C., were obtained.

What is claimed is:

1. A process for the production of conjugated diolefins which comprises reacting a tertiary olefin with an aldehyde in the presence of aqueous sulfuric acid having an acid concentration of 5.0–50% at a temperature between 50° and 250° C., and recovering the conjugated diolefins.

2. A process for the production of conjugated diolefins which comprises reacting a secondary olefin with an aldehyde in the presence of aqueous sulfuric acid having an acid concentration of 5.0–50% at a temperature between 50° and 250° C., and recovering the conjugated diolefins.

3. A process for the production of conjugated diolefins which comprises reacting an olefin of at least 3 carbon atoms to the molecule, with formaldehyde in the presence of aqueous sulfuric acid having an acid concentration of 5.0–50% at a temperature between 50° and 250° C., and recovering the conjugated diolefins.

4. A process for the production of 2,3-dimethylbutadiene-1,3 which comprises reacting trimethylethylene with formaldehyde in the presence of 5% aqueous sulfuric acid at a temperature between 95° and 105° C. and at a pressure which is at least equal to the total vapor pressure of the reactants and catalyst at the temperature of the reaction, and recovering the 2,3-dimethylbutadiene-1,3.

5. A process for the production of 2,3-dimethylbutadiene-1,3 which comprises reacting trimethylethylene with formaldehyde in the presence of 5% aqueous sulfuric acid at a temperature between 95° and 105° C., and at a pressure which is at least equal to the total vapor pressure of the reactants and catalyst at the temperature of the reaction, neutralizing the reaction mixture, drying the product, separating the product from the drying agent by filtration, and recovering the 2,3-dimethylbutadiene-1,3 from the filtrate by distillation.

ERVING ARUNDALE.
LOUIS A. MIKESKA.